(12) United States Patent
Chao et al.

(10) Patent No.: US 6,931,090 B2
(45) Date of Patent: Aug. 16, 2005

(54) METHOD OF ESTABLISHING A NUCLEAR REACTOR CORE FUEL ASSEMBLY LOADING PATTERN

(75) Inventors: Yung-An Chao, Pittsburgh, PA (US); Shengyi Si, Shanghai (CN); Frank D. Popa, Murrysville, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 332 days.

(21) Appl. No.: 10/374,691

(22) Filed: Feb. 25, 2003

(65) Prior Publication Data

US 2004/0196946 A1 Oct. 7, 2004

(51) Int. Cl.⁷ .............................................. G21C 19/00
(52) U.S. Cl. ........................... 376/267; 434/218; 703/6
(58) Field of Search ................................ 376/267, 245; 703/6; 434/218

(56) References Cited

U.S. PATENT DOCUMENTS

| | | | | |
|---|---|---|---|---|
| 5,631,939 A | * | 5/1997 | Haraguchi et al. | 376/349 |
| 5,923,717 A | * | 7/1999 | Fawks, Jr. | 376/245 |
| 6,748,348 B1 | * | 6/2004 | Russell, II | 703/6 |

FOREIGN PATENT DOCUMENTS

| | | | |
|---|---|---|---|
| JP | 62096889 A | * | 5/1987 |
| JP | 823712 A1 | * | 2/1998 |

OTHER PUBLICATIONS

Zhihong et al. "SCYCLE–Advanced Loading Pattern Optimization Code Using New Algorithm" Nov. 14, 2002 available @ http://www.3.inspi.ufl.edu/icapp03/program/abstracts/3269.pdf.*

M. van der Schaar et al. "ROSA: A Code for Fuel Management" 1996 available @ http://www.nrg–nl.com/docs/ppt/rosa/rosajt.pdf.*

F.C.M. Verhagen "ROSA, A Utility Tool for Loading Pattern Optimization" Mar. 1997 available @ http://www.nrg–nl.com/docs/ppt/rosa/rosamb.pdf.*

Si Shengyi, "Integer Permutation Programming for Fuel–Loading–Pattern Optimization of PWR", Shanghai Nuclear Engineering Research & Design Institute, 15 pp.

Taek Kyum Kim et al., "Mixed Integer Programming for Pressurized Water Reactor Fuel–Loading–Pattern Optimization", Nuclear Science and Engineering: 127, 346–357.

Shengyi Si, Integer Permutation Programming and the Loading Pattern Optimization Code SUPERLPOS Used at SNERDI, PHYSOR 2002, Oct. 7–10, 2002, 13 pp.

* cited by examiner

*Primary Examiner*—Michael J. Carone
*Assistant Examiner*—Dan Greene

(57) ABSTRACT

All possible loading patterns for a nuclear reactor core are searched and optimized for compliance with design constraints. The fuel inventory is divided into a few batches according to coarse levels of reactivity. A recursive enumeration process identifies patterns meeting selected core position constraints, which can be user modified to adjust the search space size. For the batch loading patterns satisfying the constraints, the batches are divided into several smaller batches. A sensitivity matrix linearizing the relationship between fuel assembly position and the depletion model is processed through mixed integer linear programming with branching and bounding to identify an optimal daughter loading pattern. The process is repeated through several levels of batch refinement and selection of optimal daughter patterns, including a level where burnable absorbers are assigned to feed assemblies, until the individual fuel assembly level is reached. The multiple optimal patterns remaining provide a range of solutions.

13 Claims, 6 Drawing Sheets

METHOD OF ESTABLISHING A NUCLEAR REACTOR CORE FUEL ASSEMBLY LOADING PATTERN

BACKGROUND OF THE INVENTION

1. Field of the Invention

This invention is directed to an exhaustive, deterministic method of searching for and optimizing loading patterns that satisfy designated constraints for a given inventory of fuel assemblies in a nuclear reactor core.

2. Background Information

The core of a nuclear reactor is formed by scores of elongated, rectangular fuel assemblies arranged in a cylindrical vessel. It is common to combine fuel assemblies from previous fuel cycles with new fuel. Thus, a typical inventory of fuel assemblies can be made up of about one-third new, or feed fuel assemblies, about one-third once burned fuel assemblies and about one-third twice burned fuel assemblies. While fuel assemblies within these broad categories will have similar gross characteristics, even among fuel assemblies with a common history there were differences that must be taken into account. To further complicate the problem, a number of different arrangements of burnable absorbers are placed in the feed fuel assemblies to moderate their reactivity.

The arrangement of the fuel assemblies in a loading pattern must meet certain engineering requirements, one of the most important of which is the distribution of power, including limits on power peaks within the core. Another important consideration is maximization of the fuel cycle, or the time required between refuelings.

Historically, one of two techniques has been employed to establish a suitable fuel assembly loading pattern for a reactor core. In one technique, a sequence of random shuffles of fuel assemblies is used to find a loading pattern that meets specified engineering requirements. In the other historical technique, expert rules are used to establish a suitable loading pattern. Neither of these techniques assures the establishment of an optimal loading pattern.

A more analytical approach was suggested in a paper entitled *"Mixed Integer Programming for Pressurized Water Reactor Fuel-Loading-Pattern Optimization"*, by Taek Kyum Kim and Chang Hyo Kim, published in Nuclear Science and Engineering: 127, 346–357 (1997). This technique begins by assuming an arbitrary initial reference loading pattern of the individual fuel assemblies. The number of possible loading patterns that could be generated by shuffling all of these individual fuel assemblies is formidable. Hence, it is not practical to individually evaluate each possible loading pattern discretely. In order to reduce the processing required, the problem is expressed as a continuous function that can then be differentiated to obtain an optimum solution. This is accomplished by linearizing the relationship between the physical distribution of the fuel assemblies and the pertinent engineering requirements using a generalized perturbation technique. Mixed integer linear programming incorporating branching and bounding is then implemented to determine the optimum loading pattern. As the linearization to individual fuel assemblies can introduce significant error, there is no assurance that the "optimal" loading pattern identified is in fact optimal. Accordingly, the process is repeated using the solution generated by the previous integration. There is no guarantee that subsequent solutions will converge or even that a better loading pattern will be found. The process is also heavily dependent on the initial loading pattern used.

Another method of establishing a fuel assembly loading pattern is described in the paper entitled *"Integer Permutation Programming in a Loading Pattern Optimization Code SUPERLPOS Used at SNERDI"* presented by Shengyic Si, one of the present inventors, at the PHYSOR 2002 Conference at Seoul, Korea on Oct. 7–10, 2002. This technique involves a two part process. First, the fuel assemblies for a load are grouped into batches based upon initial enrichment and depletion history. For instance, all of the feed fuel assemblies are considered one batch, the once burned fuel assemblies form a second batch, and the twice burned fuel assemblies make up the third batch. Initially, all of the fuel assemblies in each batch are considered to be identical. An enumeration program sequentially generates batch loading patterns one by one by shuffling the batches of fuel assemblies. For each enumerated batch loading pattern the reactivities of the individual fuel assemblies are utilized in the linearization of the effect of fuel assembly position on the specified engineering requirements. Again, mixed integer linear programming incorporating branching and bounding is applied to identify an optimal load pattern of individual fuel assemblies for the selected batch pattern. The second part of the technique is similar to the previously described technique, except that the linearization using the same generalized perturbation technique has smaller errors due to the smaller perturbations required with shuffling individual assemblies inside a batch. In accordance with this technique, different batch loading patterns are serially enumerated and processed to find the optimal daughter loading pattern for each batch loading pattern. A final loading pattern is then manually selected from all of the optimal daughter loading patterns that a user cares to generate.

While this latter technique is an improvement, it still has limitations. First, it does not identify the size of the problem, in that batch loading patterns are serially enumerated and processed. Also, by going directly from the batch groupings to the individual fuel assemblies in one step, there can be wasted time processing patterns that have a dead end where none of the daughter loading patterns meet the specified engineering requirements. Second, going to the individual fuel assemblies in one step, even though the differences are not so large between fuel assemblies in the same batch, still produces sizeable errors in the linearization.

There is room, therefore, for an improved method for establishing loading patterns for nuclear reactor cores.

SUMMARY OF INVENTION

The present invention is directed to a method of finding fuel loading patterns for a nuclear core. The method performs an exhaustive and deterministic search for all the patterns satisfying specified engineering requirements.

First, all of the loading patterns possible from an inventory of fuel assemblies grouped into batches of like coarse levels of reactivity are enumerated taking into account selected core load position constraints. This provides an indication of the size of the problem. If the number of possible loading patterns is too large, the number can be reduced by successive adjustment of the selected core load position constraints until the problem is reduced to an amenable size. The resulting parent loading patterns are then all analyzed for compliance with certain engineering requirements such as peak power distribution.

Second, the parent loading patterns that satisfy the specified engineering requirements are each processed further by refining the original batches assigned by coarse levels of reactivity into a larger number of smaller batches according to finer levels of reactivity. If any of the resulting daughter patterns meets the specified engineering requirements, an optimal daughter pattern is selected using the well-established branch and bound mixed integer linear programming method, where a more accurate direct perturbation technique is used instead of the generalized perturbation technique. The parent patterns are then replaced by the optimal daughter patterns and the process is repeated to generate patterns from even finer batches of fuel assemblies. This cascading scheme of batch refinement and branch and bound mixed integer linear program is repeated until the batches comprise individual fuel assemblies. Before the batch sizes are reduced to single fuel assemblies, arrangements of boron absorbers are assigned to the feed fuel assemblies, with the assemblies.

There will typically be multiple optimal fuel loading patterns at the individual fuel assembly level thus satisfying the specified engineering requirements. Selection of the pattern to be used can then be based upon criteria established by the customer, for instance, the optimal pattern that produces the longest fuel cycle. This final step can be performed manually or implemented automatically.

More particularly, the invention is directed to a method of establishing a nuclear reactor core loading pattern for loading fuel assemblies into a nuclear reactor that comprises the steps of: a) determining the reactivity of each fuel assembly, b) dividing the fuel assemblies into multiple batches of fuel assemblies of like coarse levels of reactivity, c) generating a plurality of parent loading patterns utilizing selected core load position constraints considering all fuel assemblies in each batch of fuel assemblies as having the same coarse level of reactivity, d) selecting from the plurality of parent loading patterns selected batch loading patterns, e) dividing the multiple batches of fuel assemblies into a number of refined batches of fuel assemblies according to finer levels of reactivity, f) for each selected parent loading pattern, determining whether any daughter loading pattern of the refined batches of fuel assemblies meeting the specified core load position constraints satisfies specified engineering requirements, and if so, selecting an optimal daughter loading pattern optimally meeting the specified engineering requirements, g) eliminating any selected loading patterns for which no daughter loading pattern meets the specified engineering requirements, h) for each parent loading pattern with an optimal daughter loading pattern, updating the parent loading pattern with the optimal daughter loading pattern, i) repeating steps e–h with ever finer levels of reactivity until each batch of fuel assemblies comprises a single fuel assembly, and j) selecting from loading patterns remaining, a final loading pattern.

BRIEF DESCRIPTION OF THE DRAWINGS

A full understanding of the invention can be gained from the following description of the preferred embodiments when read in conjunction with the accompanying drawings in which:

FIG. 3 is a schematic cross-sectional view of one-quarter of a nuclear reactor core illustrating assignment of fuel assemblies to initial batches based on coarse levels of reactivity in accordance with the invention.

FIG. 4 is a schematic cross-sectional view similar to that of FIG. 3 illustrating dividing the initial batches into smaller batches and showing the assignment of burnable absorbers to the feed assemblies.

DESCRIPTION OF THE PREFERRED EMBODIMENTS

Figure 1:
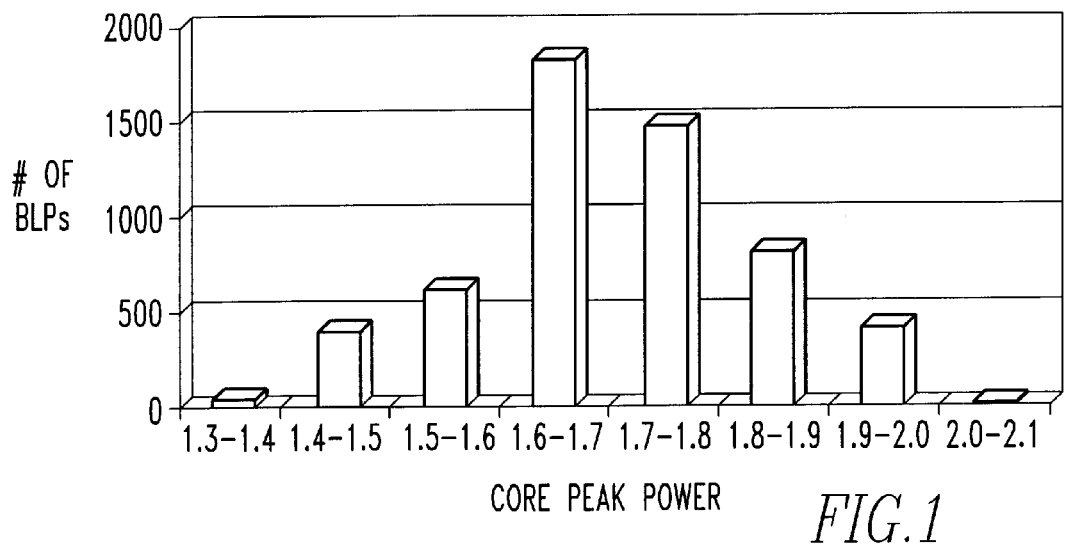
FIG. 1 is a bar graph illustrating the distribution of peak power for loading patterns enumerated in accordance with one aspect of the invention under a given set of constraints.

In general, a search method for generating a loading pattern (LP) for a nuclear reactor core contains three basic steps: (1) generating patterns by shuffling assemblies, (2) performing the spatial flux and power distribution calculation, and (3) evaluating an objective function and ranking patterns for acceptance or rejection. Although the most time consuming part of the LP search is the spatial calculation, shuffling is actually the most crucial part as it controls the search domain and hence the effectiveness of a search method. The relatively straightforward part is evaluation and ranking which are neither theoretically involved nor computationally time consuming. However, so far most LP search methods in the literature focus on the methods for spatial analysis and objective function evaluation, without providing a "theory" or "methodology" for shuffling itself. For example, both simulated annealing and genetic algorithms address objective function evaluations for decision making. The generalized perturbation theory method addresses how to perform the spatial analysis. In the absence of a systematic method for generating and pre-assessing LPs, shuffling can only be sampled heuristically and stochastically. By the time a shuffle is evaluated by an LP search code to be detrimental, it is too late, as computing time has already been wasted in the spatial analysis of the LP resulting from the shuffle. Furthermore, LP search methods based on heuristic and stochastic shuffling do not provide a sense of how good a search solution really is nor to what extent the problem has been solved, as one cannot "visualize" the explored domain. There is no information about where the domain is, how big it is, how much has been explored relative to the total solution space, whether the same solutions have been repeatedly visited or if the search is trapped in a local minimum. Consequently, solutions from stochastic LP search methods are not reproducible and cannot be objectively benchmarked.

Core designers know that the most important decision in an LP search is where the feed assemblies go and where highly burnt assemblies go. This kind of "batch" loading pattern (BLP) grossly determines the major characteristics of an LP. In practical designs, engineers work with these coarse BLPs towards refinement. The difficulty is that a designer does not know how many of these BLPs there are and it is a tedious job to track down and refine a BLP manually. There are too many possible BLPs and each can sprout into an extremely large number of refinement paths. Consequently, a designer can only manually investigate a very limited number of BLPs and the derived LPs.

We have developed a new loading pattern (LP) search method, Branching and Bounding Batch Patterns Enumerated under Constraints (B3PEC). B3PEC is a deterministic rather than a stochastic search method, using the technique of constrained enumeration and the technique of Branch and Bound (B&B) mixed integer linear programming to perform comprehensive searches.

The B3PEC search process starts with batch loading patterns. A batch is defined as a collection of "identical"

assemblies. Initially the patterns contain coarse batches, such that all the allowable BLPs that satisfy user-specified batch loading constraints are exhaustively enumerated. As the search progresses, the coarse batches get branched into finer batches. After one or two levels of branching, further branching can go directly to distinct individual assemblies providing real LPs. The branching process is carried out with the B&B mixed integer linear programming method with additional design constraints accommodated.

The problem size and the domain to be searched are first explored and assessed with the enumeration algorithm, Batch Pattern Enumeration under Constraints (BPEC). This algorithm employs only logic and integer operations and can efficiently generate each and all of the allowable BLPs under a variety of flexible position constraints. Forbidden regions of core positions can be defined for each batch where loading is not allowed. Any number of forced domains can be defined for each batch, where a minimum and/or maximum number of assemblies have to be loaded. Constraints to ban or enforce various types of clustering among assemblies of specified batch or batches can be imposed in defined regions. The above regions and domains are arbitrary and can overlap, and each one can be of a topologically disconnected shape. Using BPEC, a user can pre-determine, before any spatial calculation starts, how big a search problem is to be solved under what kind of loading constraints. A user can apply BPEC repeatedly until he is satisfied with the chosen strategy on loading constraints and the associated problem size.

When the "identical" assemblies in a batch are split into distinct and finer batches, the shuffling of the distinct assemblies within the original batch to generate the daughter patterns is an integer permutation problem, which leads to an enormously large number of daughter patterns. However, if this discrete integer permutation problem is first converted to a continuous real variable problem by imagining that the distinct assemblies could be arbitrarily taken apart and reassembled as a mixture, then the continuous variable problem can be readily solved with powerful mathematical tools. (For example, by differentiating a function of a continuous variable, one finds directly the minimum. While in the discrete variable case, the function has to be repeatedly evaluated at all discrete points to obtain its minimum.) The best continuous solution always "bounds" (is at least as good as) the best possible discrete integer solution. If the best continuous solution is not acceptable, then there is no point in analyzing and tracking all the discrete permutations from this BLP. Hence, this whole BLP "branch" can be pruned. Only those surviving BLPs will be tracked further. This process of refining BLPs is carried out with B&B mixed integer linear programming. This BLP refinement process repeats until real LPs with individually distinct assemblies appear.

The B3PEC method can be implemented by using only a production core design code for the spatial analysis of BLPs and LPs without any additional neutron diffusion module. This eliminates the inconsistency between the LP search code and the design code. In the exemplary embodiment of the invention, the Westinghouse core design code ANC is used, with its 3D to 2D collapsed model, as the spatial analysis tool. At each BLP refinement level, for each BLP, ANC 2D depletions are repeatedly performed to directly generate a sensitivity matrix (S-matrix) with respect to both burnable absorber adjustment and burnup exposure variation. The S-matrix is input to a mixed integer linear programming algorithm to perform B&B optimization, on burnable absorber assignment and in-batch shuffling, for the current level BLP to reach the next level of refined BLPs. The mixed integer linear program can accommodate any design constraint that can be expressed as a linear combination of assembly average power, assembly peak power and the core critical boron concentration at all the depletion steps. The level of refinement on BLPs that is needed before reaching real LPs depends on the available fuel inventory for the problem. Typically only one or two levels of batch refinement are needed before going directly to the individually distinct assemblies. The total number of resulting LPs depends on the total number of initial BLPs and the levels of BLP refinement. In any case, the total explored domain in the B3PEC method is immensely larger than that of other LP search methods. The resulting solutions are multiple, each with distinctly different features, which can be directly used by ANC for core designs.

The following is a simple example of how the enumeration module BPEC can be used to assess the problem size and properly define the scope of search. Checkerboard BLPs, with three batches of equal size, are considered in this example for Westinghouse type 2, 3, and 4-loop cores. No two assemblies in the same batch are allowed to be adjacent unless one of the two is on the periphery. As shown in Table I, when no additional constraints are imposed the number of solutions is very large, about ten thousand for the 2-loop core, a hundred thousand for the 3-loop core and two million for the 4-loop core. If the additional constraint is imposed that batch 1 (feed assemblies) cannot be in a specified central region, then the solutions drop dramatically to about two thousand, four thousand and six thousand respectively. If another constraint is added that only feed assemblies can be on the periphery (out/in pattern), then there are only 4, 31 and 41 solutions. All these patterns are explicitly generated by BPEC very quickly except for the case of two million solutions.

TABLE I

Number of 3-Batch, Non-peripheral Checkerboard BLPs

| Additional Constraint | 2-Loop | 3-Loop | 4-Loop |
| --- | --- | --- | --- |
| None | 12,342 | 127,932 | 1,995,472 |
| No Feeds in Central Region | 1,798 | 3,692 | 5,649 |
| And Only Feeds on Periphery | 4 | 31 | 41 |

Figure 2:
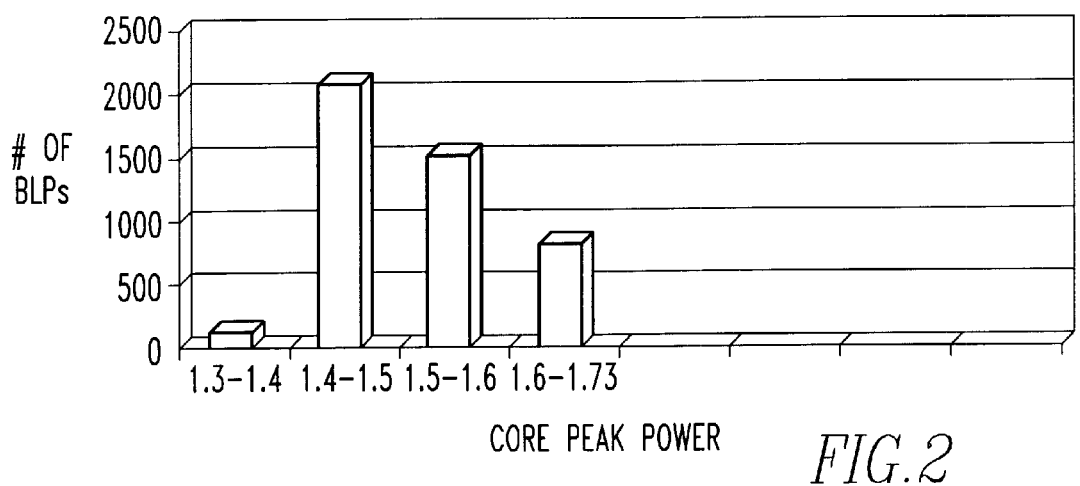
FIG. 2 is a bar graph similar to that of FIG. 1 generated with refined constraints.

To show how effectively BPEC can be used to define the scope of search, the 5649 4-loop BLPs in Table I, where no feed assemblies are allowed in a central region, are analyzed dimensionally at beginning of cycle (BOC). FIG. 1 displays the distribution of core peak power for all 5649 BLPs. Obviously many of the patterns are not good at all. To improve the search space, we now impose an additional new constraint, yet relax one old constraint. We divide the core into an inboard region and an outboard region. The additional constraint is that in the inboard region, only the low reactivity twice burnt fuel (batch 3 in this case) can be adjacent to the feeds to balance out the high reactivity. This constraint should get rid of many high peak patterns and reduce the number of solutions. Then we remove the constraint that the once burnt fuel (batch 2 in this case) cannot cluster with itself. This is reasonable, because although one would like to smear out and mix assemblies of high and low reactivity, there is no reason why the medium reactivity assemblies have to be spread out as well. The relaxing of this constraint should increase the number of acceptable solutions. With these two changes, the total number of solutions change from 5649 to 4583. As we can see in FIG. 2, these solutions are now much better than the ones in FIG. 1. All high peak power solutions are removed and there are many more solutions with low peak power. This demonstrates that by using very simple and generic physical argument, one can effectively assess and define the search scope.

Figures 3, 4:
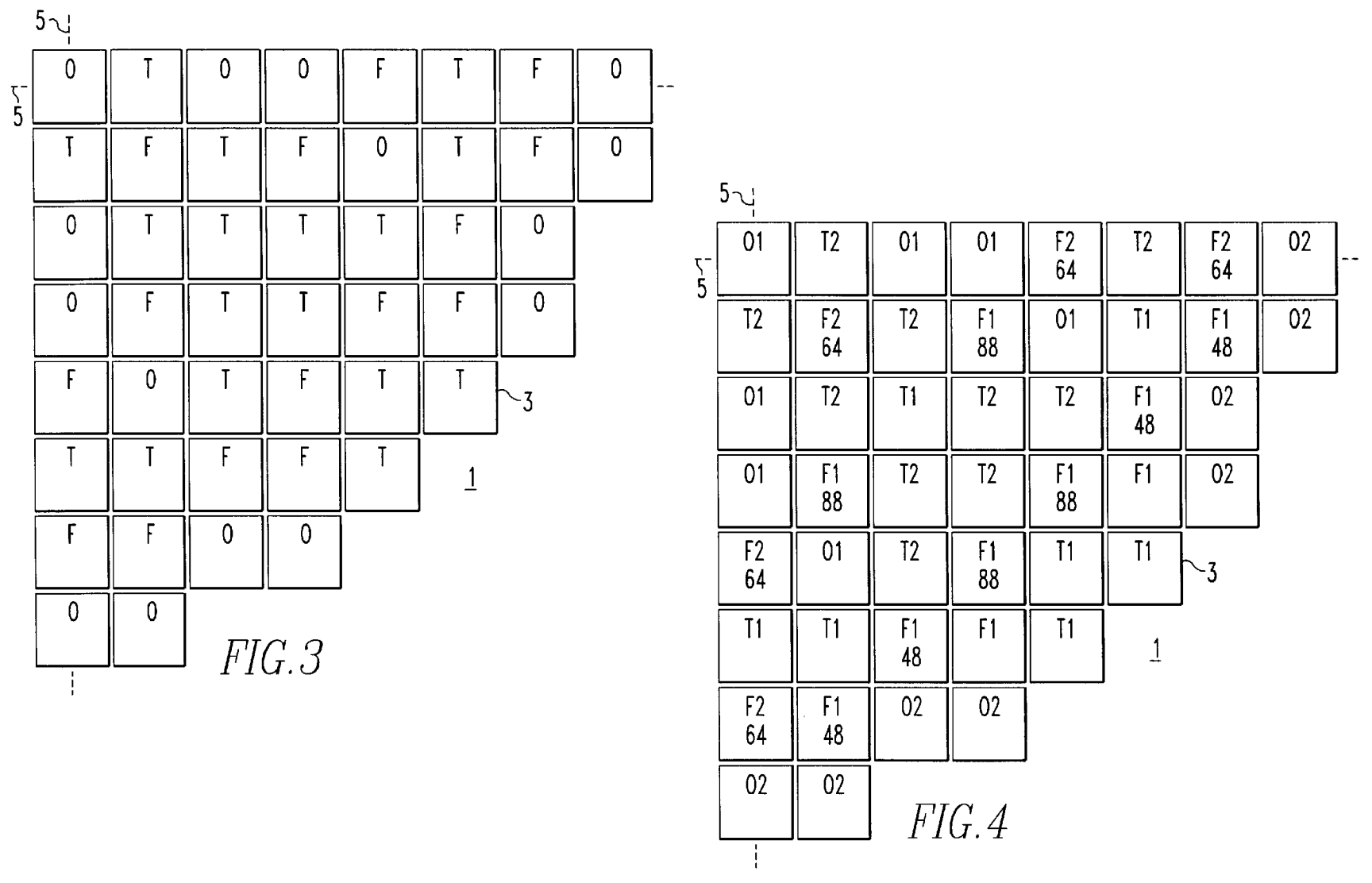

FIG. 3 illustrates schematically a quadrant of a nuclear reactor core 1 to which the invention is applied. The core 1 is made up of a plurality of square fuel assemblies 3. Only one quadrant is shown because the core 1 is symmetrical about the two orthogonal axes 5. The top row of fuel assemblies is common with the quadrant above while the left column is common with the quadrant to the left of that shown, and the upper left most fuel assembly is a center fuel assembly common to all four quadrants. Thus, the exemplary core 1 has 157 fuel assemblies 3.

FIG. 3 illustrates an example of an initial batch loading pattern generated by the enumeration process. This is for a 3-loop Westinghouse reactor, although the core position constraints are different from that used in the example above. However, as in the previous example, the inventory of 157 fuel assemblies was divided into three batches of like coarse reactivity. The batches were determined by the burnup history so that there are feed assemblies identified by the letter "F", once burned fuel assemblies identified by the letter "O", and twice burned fuel assemblies identified by the letter "T".

It is assumed here that this parent batch loading pattern illustrated in FIG. 3 meets the specified engineering requirements and, therefore, the three initial batches are each divided into two batches with finer levels of reactivity. As shown in FIG. 4, the feed assemblies, the once burned assemblies and the twice burned assemblies are divided into batches identified as F1 and F2, O1 and O2, and T1 and T2, respectively. FIG. 4 is an example of one daughter pattern derived from the parent batch loading pattern of FIG. 3. There are numerous other daughter patterns that can be derived from the parent pattern of FIG. 3 by shuffling the finer batches as in FIG. 4. The finer batches are each only shuffled among each other. Thus, the F1 and F2 feed assemblies are shuffled between their respective positions. Similarly, the O1 and O2 and separately the T1 and T2 assemblies are only shuffled among each other. A linearization of the relationship of fuel assembly position to power distribution is performed via direction perturbation using ANC 2D depletion to generate a sensitivity matrix (S-matrix). The S-matrix is input to the mixed integer linear programming algorithm to perform B&B optimization and thereby select the optimal daughter loading pattern, which is substituted for the parent loading pattern from which it was derived for the next level of refinement of the batch loading pattern.

Before reaching the individual fuel assembly level of refinement, arrangements of burnable absorbers (BAs) are added to the feed fuel assemblies. Several different arrangements are used in different feed fuel assemblies. Thus, as shown in FIG. 4, some of the F1 fuel assemblies are assigned 48 BAs and others are assigned 88. In the particular example of FIG. 4, the F2 feed assemblies are all assigned 64 BAs. Various arrangements of BAs can be assigned to the feed assemblies. This assignment of BAs creates a new distribution of fuel assembly reactivities. The F1 fuel assemblies with 48 BAs are treated as one sub-batch with those assigned 88 fuel assemblies considered a separate batch with a refined level of reactivity. Thus, assignment of the BAs creates another level of refinement in which the batches are treated similarly as in the previously described level of refinement.

Following an identification of an optimal batch loading pattern for feed assemblies containing BAs, a final step of refinement produces real loading patterns at the individual fuel assembly level. Although some of the loading pattern paths will be eliminated because they do not produce loading patterns which meet the specified engineering requirements, the process will produce a significant number of real loading patterns that all meet the specified engineering requirements. This result gives the user a good deal of flexibility in selecting a final loading pattern depending upon preferences and selected criteria. The final selection can be done manually by the user or automatically. For instance, the real loading patterns developed can be processed automatically to select the one that provides the longest fuel cycle.

Figure 5:
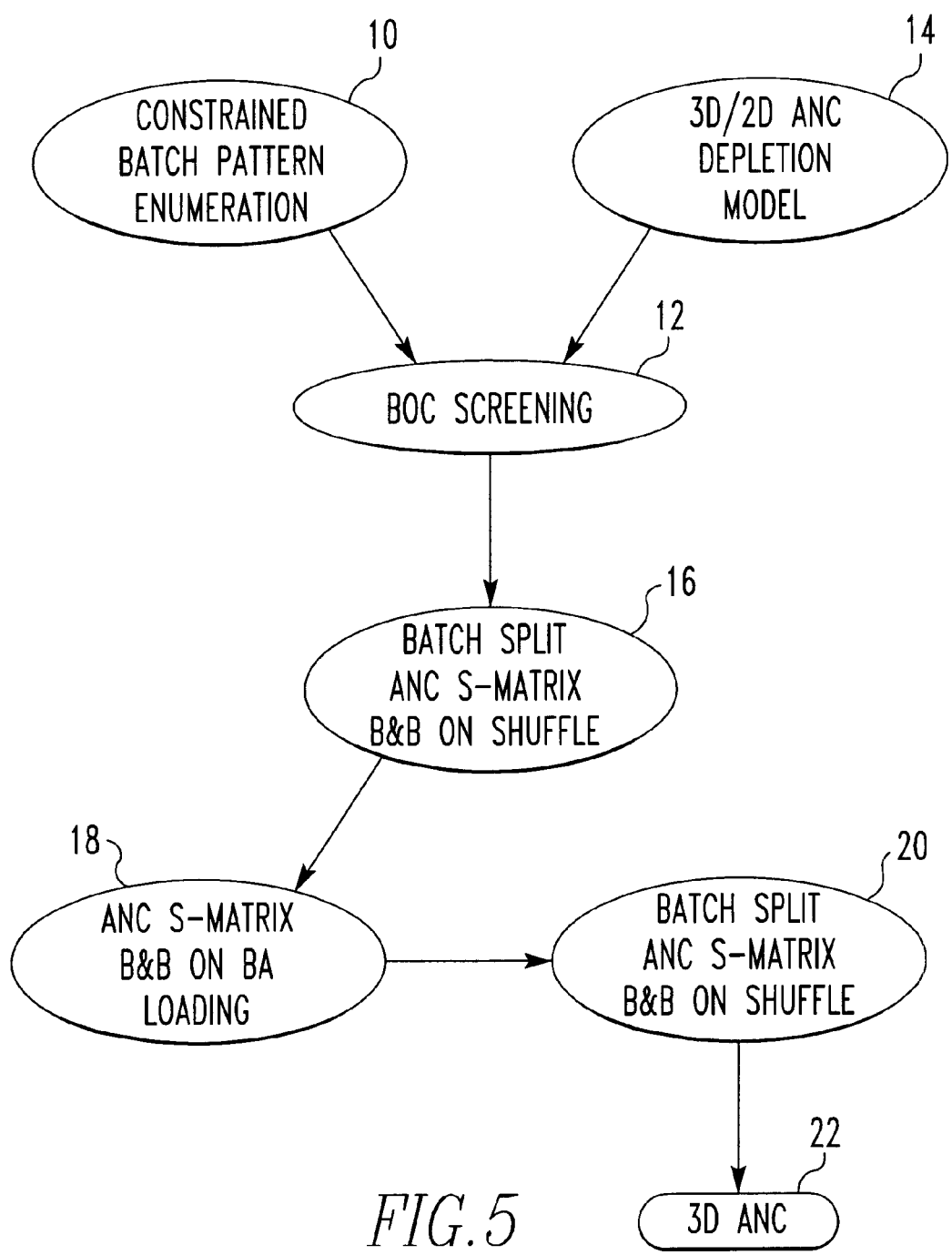
FIG. 5 illustrates the broad steps of the method of the invention for establishing loading patterns for the fuel assemblies of a nuclear reactor core.

FIG. 5 illustrates the overall method in accordance with the invention. As shown, batch pattern enumeration with constraints is performed at 10 to enumerate all the possible initial batch patterns. Beginning of cycle (BOC) screening is then performed on the enumerated batch patterns at 12 using the two-dimension ANC depletion model 14 to select the enumerated batch patterns that meet specified engineering requirements. At 16 each of the selected enumerated batch patterns is split into batches of finer reactivity, ANC 2D depletion is performed to generate an S-matrix. The S-matrix is then input into a mixed integer linear programming algorithm to perform branching and bounding (B&B) on a shuffle of the split batches of fuel assemblies to identify an optimal daughter loading pattern. If there is no daughter loading pattern that meets the criteria, that branch is discarded.

For branches having an optimal daughter loading pattern, that daughter loading pattern is used at 18 with a selected burnable absorber loading pattern to again generate an S-matrix to which branching and bounding is performed with the mixed integer linear programming algorithm to determine an optimal daughter loading pattern taking into account the BAs. A final batch split to the individual fuel assembly level is then performed, spatial analysis is used to generate another S-matrix, and then branching and bounding is applied to the shuffle of the fuel assemblies all at 20 to produce real loading patterns. A three-dimensional spatial analysis is then performed at 22 to select a final loading pattern.

Figure 6A:
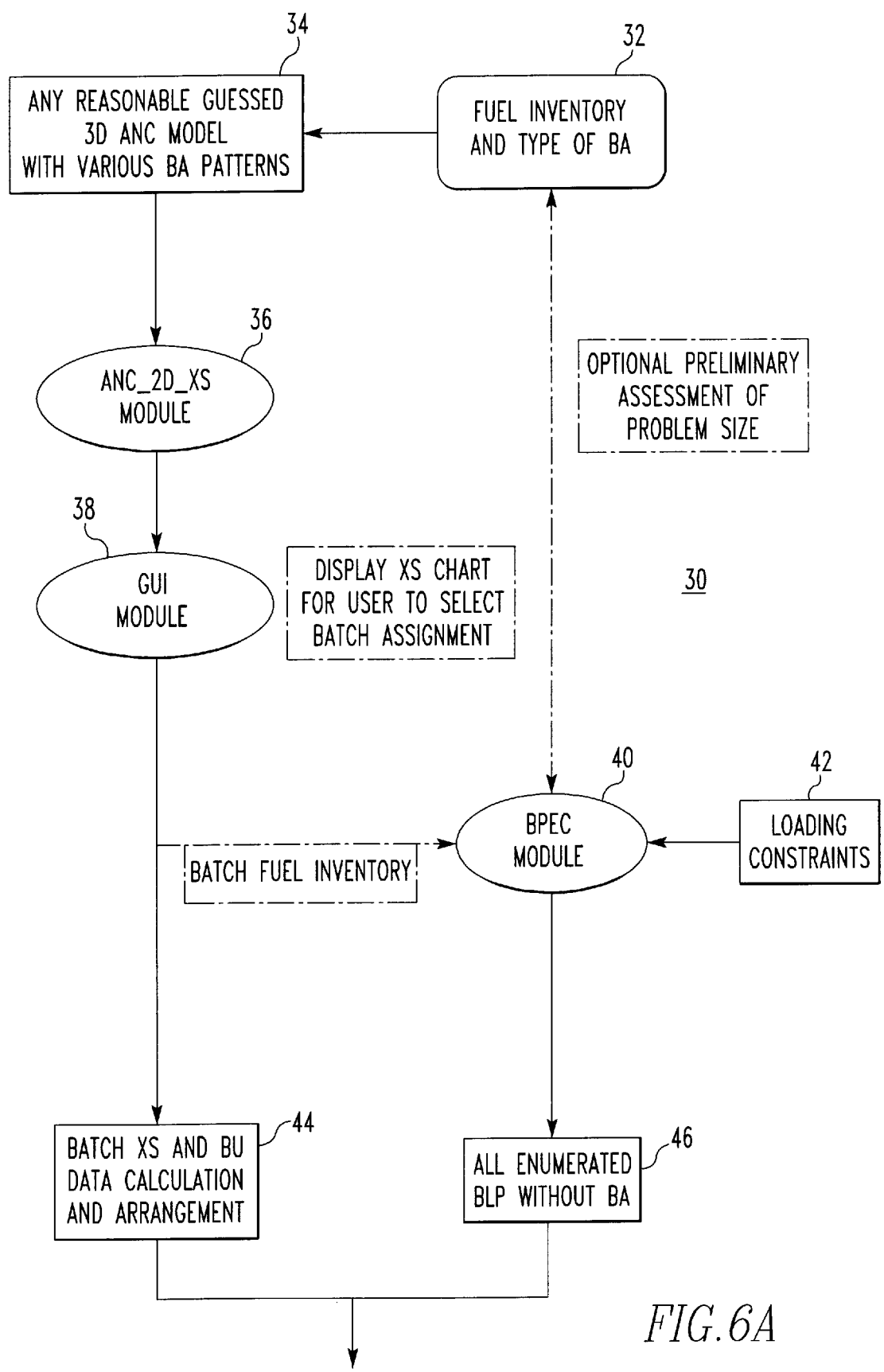
FIGS. 6A, 6B and 6C illustrate a flow chart of software implementing the invention.
Figure 6B:
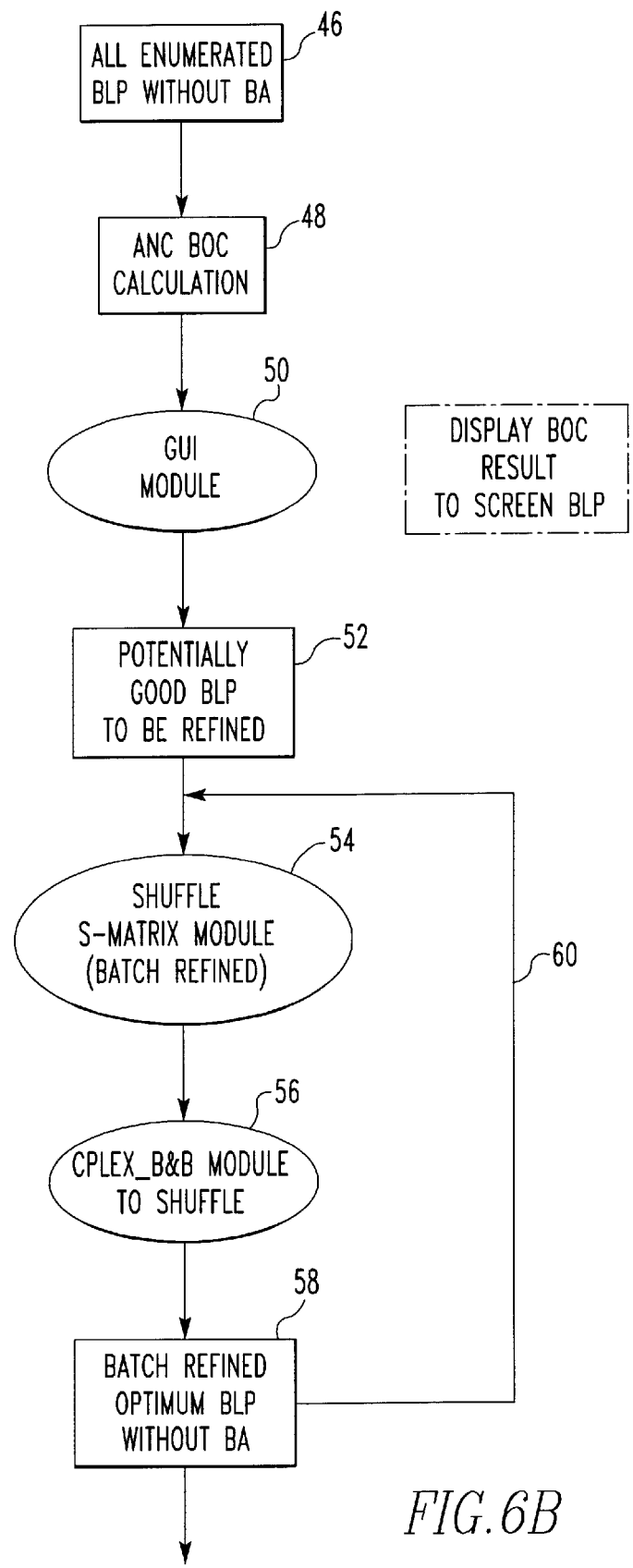
Figure 6C:
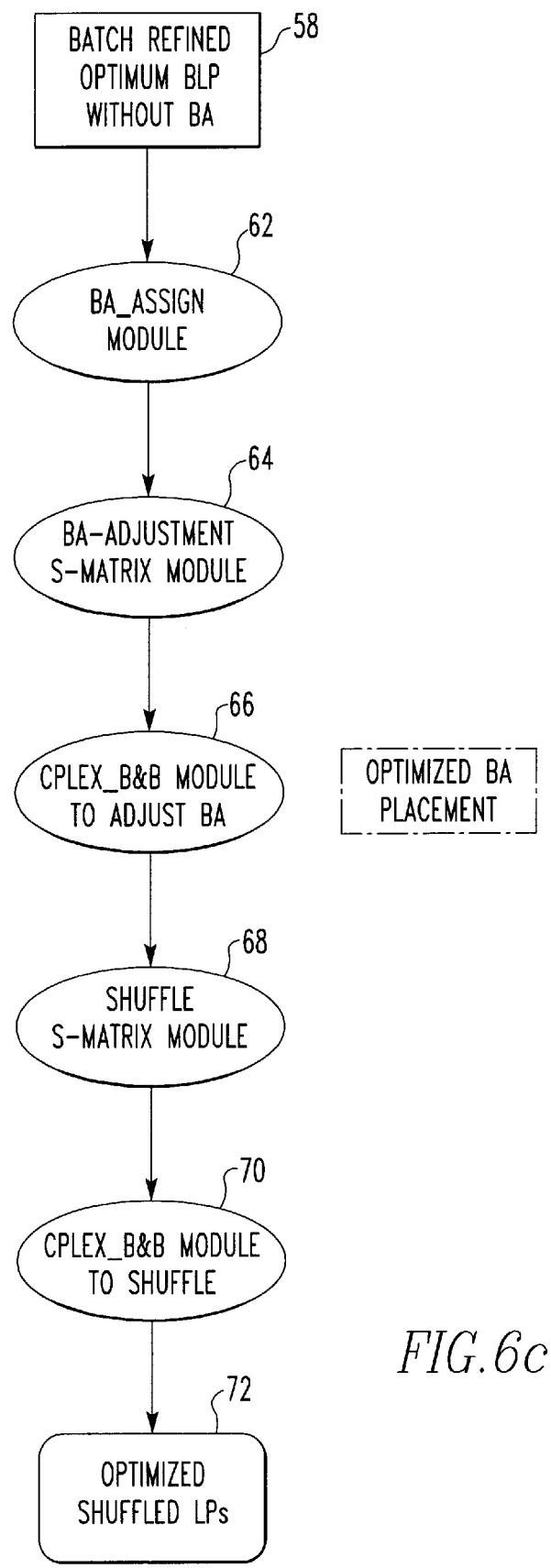

A flow chart of the method of the invention is illustrated in FIGS. 6A–6C. There are five major components of the method:

1. A recursive algorithm for Batch Pattern Enumeration under Constraints (BPEC),
2. A 3-D ANC based 2D ANC depletion model valid for all LP (ANC_2D_XS),
3. An estimation routine for initial BA assignment to each batch pattern (BA_ASSIGN),
4. A perturbation/depletion sensitivity matrix for each batch pattern (S-matrix), and
5. A CPLEX based B&B search algorithm using the S-matrix (CPLEX_B&B).

As shown in the flow chart 30, inputs to the method are the fuel inventory and the type of burnable absorbers 32. In addition, any reasonable 3D ANC model with various BA patterns 34 is used to generate the 2D ANC depletion model 36, which is valid for all LPs using the same fuel inventory. A GUI (graphic user interface) module 38 is used to display the cross section core for the user to select batch assignment. The BPEC module 40 enumerates all the initial batch loading patterns using the user identified loading constraints 42. A selected batch assignment is also used for batch cross section and burnup data collection and arrangement at 44. All of the BLP without BA 46 generated by the BPEC module 40 are then analyzed using the ANC BOC (beginning of cycle) calculation 48. The GUI module then displays the results at 50 for the user to select the potentially good BLP to be refined at 52. By good BLP it is meant those that meet the specified engineering requirements such as the limit on peak power previously described. The S-matrix model is then used at 54 to generate the S-matrix for the refined batch assignments. The sensitivity or S-matrix is used to reconstruct the 2D depletion results for any in-batch shuffles of the reload assemblies and as will be seen below for the BA adjustments in feed assemblies.

The S-matrix is calculated as the core neutronic solution response to the core perturbation, by performing 2D ANC depletion on the base case and the perturbed case. Two kinds of S-matrices are calculated. The S-matrix for in-batch shuffle is obtained by making burnup perturbation at the location of each burnt fuel assembly. The S-matrix for BA adjustment is obtained by making a BA number perturbation at the location of each feed fuel assembly.

Each BLP has its own S-matrix. Once the S-matrix for in-batch perturbation is available, a commercial code CPLEX (available from ILOG, Inc., Mountain View Calif.) is used together with the S-matrix to perform in-batch reload assembly shuffles, and as will be seen below, in-batch feed assembly BA adjustments.

CPLEX is a very effective optimization code using a SIMPLEX-type linear programming method for real variable solution search and the branch and bound method for integer variable solution search. The key idea of B&B is that integer solutions are a subset of continuous solutions. If the best real variable solution is not acceptable then there is no point in searching for the integer solutions. Thus, in following an integer event tree, real variable linear programming is repeatedly used to set bounds for pruning branches that cannot possibly generate good solutions. CPLEX includes options for choosing different types of constraints and objective functions. There is also a generic input that the user can use to customize a special constraint and/or objective function. Any function that can be expressed linearly in terms of node power, node peak power and core PPM at all the depletion steps can be constructed as a constraint or an objective function.

Multiple levels of refining batches without BAs can be performed as indicated at 60.

Before reaching the individual fuel assembly level, the BAs are introduced. The BA_ASSIGN module 62 provides an initial BA assignment using the following process.

1. From the BOC 2D ANC solution for each BLP the power distribution, k-effective distribution, and the PPM value are available. From the BOC PPM value, the required number of BA in order to meet the moderator temperature coefficient (MTC) requirement can be determined.
2. From the above BOC data, plus any BA position constraint that the user may want to specify, the BA assignment in feed assemblies can be determined that will make the power sharing in feed assemblies (excluding peripheral feed assemblies) as flat as possible. However, the resulting BA assignments may not all be supportable by the allowable BA patterns.
3. The BA assignments in step 2 are matched to a few "basic" BA patterns (for a given BA type). This matching is done by rounding off the assignment to the nearest basic BA pattern.

The CPLEX_B&B module is then used at 66 to adjust the BAs to obtain the optimized BA placement. The BA pattern in a feed assembly can only be adjusted (up or down) to its next neighbor of the "basic" BA patterns. CPLEX will determine the BA adjustment to end up with using no more than a certain number of different BA patterns constrained by the user. After establishment of the BA pattern, a final shuffle of the individual fuel assemblies and generation of the corresponding S-matrix is performed at 68. CPLEX is then used at 70 to obtain the optimized shuffled LPs (real LPs) at 72.

The invention provides a new deterministic method for establishing a loading pattern for a nuclear reactor core. It is built on two techniques, the technique of recursive pattern enumeration under position constraints and the B&B mixed integer linear programming. The method has the potential of searching comprehensively all of the loading patterns in which the user is interested. Unlike stochastic search methods, where a user does not know how the search is progressing, the B3PEC method enables a user to have a good idea of how the search is progressing. The user defines the search domain and knows what part of the solution space has actually been searched and to what degree the problem is solved. The size of the search problem and its running time can both be pre-estimated by the user. The method can be implemented using a design code directly without the need of a separate module for a neutron diffusion calculation. Finally, by applying linearization via direct perturbation in several steps to batches of fuel assemblies in which the reactivities are fairly close to begin with, the results are more likely to satisfy the specified engineering requirements.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of establishing a nuclear reactor core loading pattern for loading fuel assemblies into a nuclear reactor, comprising the steps of:

a. determining the reactivity of each fuel assembly;
   b. dividing the fuel assemblies into multiple batches of fuel assemblies of like coarse levels of reactivity;
   c. generating a plurality of parent loading patterns utilizing selected core load position constraints considering all fuel assemblies in each batch of fuel assemblies as having the same coarse level of reactivity;
   d. selecting from the plurality of parent loading patterns, selected parent loading patterns;
   e. dividing the multiple batches of fuel assemblies into a number of refined batches of fuel assemblies according to finer levels of reactivity;
   f. for each selected parent loading pattern, determining whether any daughter loading patterns of the refined batches of fuel assemblies meeting the specified core load position constraints satisfy specified engineering requirements, and if so, selecting an optimal daughter loading pattern optimally meeting the specified engineering requirements;
   g. eliminating any selected parent loading patterns for which no daughter loading pattern meets the specified engineering requirements;
   h. for each parent loading pattern with an optimal daughter loading pattern, updating the parent loading pattern with the optimal daughter loading pattern;

i. repeating steps e–h with ever finer levels of reactivity until each batch of fuel assemblies comprises a single fuel assembly; and j. selecting from loading patterns remaining, a final loading pattern.

2. The method of claim 1 wherein generating a plurality of parent loading patterns comprises generating all possible parent loading patterns meeting the selected core loading position constraints.

3. The method of claim 2 wherein step c is repeated utilizing modified core position constraints to adjust the number of all possible parent loading patterns.

4. The method of claim 1 wherein step d comprises selecting selected engineering requirements, and only selecting as selected parent loading patterns, those parent loading patterns that meet the selected engineering requirements.

5. The method of claim 4 wherein the selected engineering requirements comprise beginning of cycle peak power limitations.

6. The method of claim 4 comprising using a core design code model to select parent loading patterns that meet the selected engineering requirements.

7. The method of claim 1 wherein the fuel assemblies include feed assemblies, once burned fuel assemblies, and twice burned fuel assemblies, and step b comprises dividing the fuel assemblies into three batches with a first batch containing the feed assemblies, the second batch containing the once burned assemblies, and the third batch containing the twice burned assemblies.

8. The method of claim 1 wherein some fuel assemblies comprise feed fuel assemblies and wherein repeating steps e through i comprises, prior to each batch of fuel assemblies comprising a single fuel assembly, assigning boron absorbers to the feed fuel assemblies in a plurality of configurations and identifying feed fuel assemblies with the same configuration of boron absorbers as a batch.

9. The method of claim 8 wherein the step of assigning boron absorbers to the feed fuel assemblies in a plurality of configurations comprises assigning a base arrangement, and step i comprises determining an optimal arrangement of the plurality of boron absorber configurations.

10. The method of claim 1 wherein step f comprises generating a linear representation of a relationship between the daughter loading patterns and the specified engineering requirements and determining from the linear representation whether any of the daughter loading patterns meet the specified engineering requirements and if so, selecting the optimal daughter loading pattern.

11. The method of claim 10 wherein the step of generating a linear representation of the representation between the daughter loading patterns and the specified engineering requirements comprises applying direct perturbation to a core design algorithm incorporating the specified engineering requirements to generate a sensitivity matrix.

12. The method of claim 1 wherein the final loading pattern is selected automatically as the refined loading pattern refined to the level of single fuel assembly batches that best achieves designated engineering requirements.

13. The method of claim 12 wherein the designated engineering requirements comprise a maximum length fuel cycle.

* * * * *